United States Patent [19]

Maccalous et al.

[11] 4,112,179

[45] Sep. 5, 1978

[54] METHOD OF COATING WITH ABLATIVE HEAT SHIELD MATERIALS

[76] Inventors: Joseph W. Maccalous, 7210 S. Sheridan Ct., Littleton, Colo. 80123; Donald A. Thomas, 3005 W. Tufts Ave., Englewood, Colo. 80110

[21] Appl. No.: 639,503

[22] Filed: Dec. 10, 1975

[51] Int. Cl.² ............................ B32B 5/16; B05D 1/02
[52] U.S. Cl. .............................. 428/325; 260/33.6 SB; 260/37 SB; 260/826; 427/387; 427/388 A; 427/407 R; 427/409; 427/421; 428/447; 428/450; 428/920
[58] Field of Search ............... 427/154, 156, 421, 427, 427/409, 387, 388 A, 407 R; 428/447, 450, 920, 325; 260/33.6 SB, 37 SB, 826

[56] References Cited

U.S. PATENT DOCUMENTS

| 3,317,455 | 5/1967 | Blome et al. ...................... 260/37 SB |
| 3,433,764 | 3/1969 | Walmsley ...................... 260/33.6 SB |
| 3,527,728 | 9/1970 | Gibbon et al. ................ 260/33.6 SB |
| 3,553,002 | 1/1971 | Haraway ............................... 427/154 |
| 3,623,904 | 11/1971 | Ramseyer ........................ 260/37 SB |
| 3,678,126 | 7/1972 | Saam et al. ................... 260/33.6 SB |

Primary Examiner—Harry J. Gwinnell
Attorney, Agent, or Firm—Sughrue, Rothwell, Mion, Zinn and Macpeak

[57] ABSTRACT

A novel method for the spray application of an ablative material to produce a coating having low density, high tensile strength and improved char retension comprising spraying a composition of silicone resin, silicaceous fibers and hollow silicaceous microspheres in a solvent and curing to form an ablative coating having a density of 10 to 15 lbs/ft$^3$.

11 Claims, No Drawings

METHOD OF COATING WITH ABLATIVE HEAT SHIELD MATERIALS

BACKGROUND OF THE INVENTION

A. Field of Invention

The present application relates to a novel coating system which can be used on specific areas of ascent and re-entry vehicles or in any other application in which ablative coatings may be advantageous.

B. Description of Prior Art

Heretofore in the art of forming ablative heat shield coatings, one method utilized expensive pressure molds or dies into which batches of materials were placed and vacuum cured at 300° F. The resultant molded coating was then machined and applied by secondary bonding under a pressure of 1-3 psi to the specific surface for which the mold was intended. This process involves clear and numerous disadvantages, such as the use of expensive molds and dies, high labor costs and the necessity of mixing large batches of materials.

Additionally, U.S. Pat. No. 3,553,002 - Haraway, Jr., et al., teaches a sprayable ablative system which has the distinct disadvantage of producing a coating with a relatively high density of over 35 lbs/ft$^3$.

The prior art method described in U.S. Pat. No. 3,210,233, Kummer et al., involves a non-metallic honeycomb having a heat insulating and ablative composition in the cells. This arrangement has the disadvantages of difficulty in applying the ablative and in the expense of the honeycomb.

It is an object of this invention, therefore, to provide a method for producing sprayable ablative compositions capable of depositing ablative coatings having lower density than the prior art products and at the same time having increased thermal improved properties of insulation and adherence.

In addition, it is an object of this invention to produce a method of applying such ablative coatings simply, inexpensively and in a manner that allows close control of the coating thickness.

SUMMARY OF THE INVENTION

The present invention comprises a composition comprising the following constituents:

1. A flexible silicone resin component, such as, RTV-652, RTV-655, Silgard-182, etc.
2. A silicaceous component including, for example, ¼ inch fibers of glass and silica, ½ inch fibers of glass and silica, and 1 inch fibers of glass.
3. A hollow microsphere component including microspheres of carbon, glass and silica.
4. A solvent component to dissolve the resin and serve as carrier for the other components, comprising n-heptane.
5. As an optional component, a filler such as carbon, cork, silica, polymer spheres, etc.

In this invention the selection of n-heptane as a solvent allows for the laying down of a uniform sprayed layer of heat shield material. By varying the spraying technique, ablators with densities ranging from 10 to 15 lbs/ft$^3$ can be produced. This reduced density is apparently due in part to a distribution of fine voids which are left when the solvents evaporate. This marked advance in the reduction of ablative heat shield coating density vastly improves the desired characteristics by lowering thermal conductivity, reducing the ablator weight and possibly increasing flexibility and elongation. Use of this invention on ascent and re-entry vehicles will prove of great value since minimum ablator weight is critical in these applications.

It has been found that the solvent utilized in the spray application of an ablator system is critical to the characteristics of the final product. Specifically, it has been found that if the solvent utilized does not evaporate quickly enough, subsequently sprayed layers of the ablator will "trap" the solvent in the lower layers and cause higher ablator density. Additionally, the "trapped" solvent might contain impurities that, if allowed, to stay beneath the surface, will interfere with the curing mechanism of the resin system.

If the solvent chosen evaporates or "flashes" too quickly, a gradient will occur whereby the outer surface of each of the sprayed layers will be substantially drier than the interior of that layer. Subsequent spraying will result in the new "wet" layer coming into contact with a substantially drier layer, to produce a bond between the layers that is weaker than desired. Thus, inter-layer peeling may result.

It has been found that the use of an n-heptane based solvent system results in an ablative coating of low density, high strength and increased flexibility. Further, n-heptane is useful for a wide variety of resin systems. Modifications to this basic solvent can be made to achieve optimum ablator and spraying characteristics.

In accordance with the present invention, a novel method for the application of an ablative coating is provided together with the resultant improved ablative coatings by which an improved ablative protection for various purposes is obtained.

DETAILED DESCRIPTION OF THE INVENTION

Each of the components of the sprayable ablative coating composition of this invention is discussed in detail below.

1. Flexible Silicone Resin Component

Resins for use in this invention can be the room temperature vulcanizing (RTV) silicone rubbers which are well-known in the art. Among the RTV silicone resins the two-part, fast curing materials are RTV-652 and RTV-655 resins maufactured by General Electric Company.

Alternatively, silicone resins which require a higher curing temperature may be utilized. Preferred among these resins is the SYLGARD resin system manufactured by Dow Corning.

The General Electric RTV-652 resin is produced by mixing the "A" and "B" portions. The "A" portion is a dimethyl polysiloxane containing phenyl groups for low temperature properties, vinyl groups for reactivity and a soluble platinum catalyst in the 1-50 ppm range. The "A" portion has a viscosity of 4,000 centipoise at 77° F. and a refractive index of 1.43. The "B" portion is a dimethyl polysiloxane containing silicone hydride groups which, upon mixing with the "A" portion, add across the unsaturated double bond of the vinyl group. The resin is cured by mixing one part of the "B" portion to 10 parts of the "A" portion. This material has a pot life of 7 to 12 minutes.

The SYLGARD-182 silicone resin cures as moderate temperatures, e.g., 65° C., for 4 hours, but can be accelerated by using higher temperatures. This is also a two-part resin wherein one part of curing agent is with the ten parts of the base resin.

Alternately, two resin systems such as RTV-652 and RTV-655 may be used together to achieve the desired properties.

2. Silicaceous Fiber Component

The preferred fiber systems for use in this invention are fibrous silicaceous materials of lengths up to about 1 inch. The optimum fiber length is about ¼ inch, although longer fibers may be utilized, but this tends to lead to difficulty in spraying and to relatively non-uniform spraying.

Especially preferred for use as the fibrous component is "Refrasil" manufactured by E. I. DuPont Company. The optimum available size for the purpose of this invention is "Refrasil" F100-A25, a ¼ inch in length and approximately 0.0004 inch in diameter and has a bulk density of about 13 lbs/ft$^3$. A typical composition of the "Refrasil" is as follows:

|  | % |  | % |
|---|---|---|---|
| $SiO_2$ | 99.3 | CaO | 0.01 |
| $TiO_2$ | 0.38 | MgO | 0.01 |
| $Al_2O_3$ | 0.18 | $Na_2O$ | 0.002 |
| $ZrO_2$ | 0.02 | $K_2O$ | 0.005 |
| $B_2O_3$ | 0.07 | $Li_2O$ | 0.0002 |

Glass fibers can be utilized alone or mixed with silica fibers.

3. The Hollow Microsphere Component

The small hollow spheres for use in this invention may be composed of materials such as carbon, glass or silica.

Preferred among these materials are the "SI Eccospheres" manufactured by Emerson & Coming, Inc., of Caton, Massachusetts. This material is composed of silicon and has a bulk density of about 11 lbs/ft$^3$ particle size of 30–125 microns with a wall thickness of about 2 microns.

Alternatively, materials such as "IG-101 Eccospheres" and "R Eccospheres", also may be utilized if lower cost is desired. The "IG-101" hollow spheres manufactured by Emerson & Cuming, Inc., are composed of sodium borosilicate, glass and have a bulk density of about 15 lbs/ft$^3$ particle size of 10–250 microns with a wall thickness of about 2 microns.

The "R" hollow spheres are composed of electrical grade glass and have a bulk density of about 14 lbs/ft$^3$, particle size of 30–200 microns with a wall thickness of about 2 microns.

Apparently no change in basic physical properties results from the substitution of "R" or "IG-101 Eccospheres" for the "SI" material except that the use of "IG-101" spheres increases the density of the final material by about 2 lbs/ft$^3$.

The thermal conductivity of these materials is about 0.45 BTU/hr/° F./sq.ft/in for IG-101 and R, with a value of about 0.40 BTU/hr/° F./sq.ft/in for the SI material.

4. Filler Component

Materials such as cork, "Phenolic Microballoons", carbon spheres, carbon and CAB-O-SIL may be added to the ablative of this invention to effect certain properties.

Cork may be employed to reduce density and improve the insulative properties. Especially useful is the material designated "Prime Milled Ground Cork" with a sieve size of 20/40 and a bulk density of 6–8 lbs/ft$^3$.

"Phenolic Microballoons", a registered trademark of Emerson Cuming, Inc., of Canton, Massachusetts, are small hollow spheres of phenolformaldehyde resin and can be used to lower thermal conductivity and improve char formation. Especially preferred are BAKELITE Phenolic Microballoons, available from Union Carbide Corporation under the designation BJO-0930, which have a maximum bulk density of 6.5 lbs/ft$^3$ and a maximum liquid displacement density of 0.21–0.25 g/cc. This material has a size range of 0.0002 to 0.005 inch in diameter with an average particle size of about 0.0017 inch in diameter.

Carbon powder provides a high emissive element which helps provide reradiative properties in the product as well as improved spraying characteristics in the application as seen by a reduction in spray pressures. Additionally, tensile properties improved from 10–15 psi to 25–30 psi with no increase in density of the final product.

Especially preferred is carbon designated as P-33, available from R. T. Vanderbilt Corporation, which is a 99.5% pure amorphous carbon powder with an average particle size of 320 millimicrons and a bulk density of 1.91 lbs/ft$^3$.

CAB-O-SIL, made by the Cabot Corporation of Boston, Massachusetts, is a submicroscopic fire-dry silica which can have an average diameter of from 70 to 500 angstroms and a surface area of from $-100$ m$^2$/g to 50 m$^2$/g., depending on the grade selected.

All fillers should be free from contaminants such as sulphur which may interfere with the resin curing. This can be effected by washing with a suitable solvent such as methyl ethyl ketone and vacuum drying to remove all solvent.

Other fillers which can be used within the scope of this invention are graphite fibers, wood shavings, alumina fibers and similar materials.

The solid fillers and fibers used may be coated with a silane coupling agent before their addition to the resin.

5. The Solvent Component

As solvents and carriers for the ablative compositions of this invention, systems based on n-heptane have been found to be suitable. Freon, or similar solvents, may be used but they are more expensive and give a somewhat weaker and more porous coating.

The preferred solvent system is a combination of n-heptane and a higher boiling inert solvent, for example, xylene. The higher boiling solvent is employed to extend the "flash" time of the sprayed composition as desired to permit optimum interlayer knitting. This is believed to be accomplished by a mechanism whereby the sprayed composition remains semi-liquid, due to the lower evaporation rate of the higher boiling liquid, long enough to allow the more deeply deposited solvents to surface and evaporate.

Especially preferred is a solvent system comprising 85 to 100% n-heptane and 15 to 0% xylene.

Various ablative compositions were made to demonstrate the improved properties which can be obtained by employing this invention.

EXAMPLE 1

Especially preferred among the ablative compositions within the scope of this invention is the composition set forth below which contains a mixture of the RTV-652 and RTV-655 resins described above, has a pot life of 45–60 minutes and cures at room temperature within 24 hours.

| COMPONENT | | gm | % |
|---|---|---|---|
| 1. Resin | | | |
| RTV-652 | A | 1000.0 | 18.06 |
| | B | 100.0 | 1.80 |
| RTV-655 | A | 922.5 | 16.66 |
| | B | 92.2 | 1.66 |
| 2. Fibers | | | |
| F-100-A25 Refrasil | | 600.0 | 10.83 |
| 3. Microspheres | | | |
| SI Eccospheres | | 1385.0 | 25.02 |
| 4. Filler | | | |
| Cork | | 1155.0 | 20.85 |
| Phenolic Microballoons | | 230.0 | 4.15 |
| P-33 Carbon | | 53.8 | 0.97 |
| | | 5538.5 gms | 100.00% |
| 5. Solvent | | | |
| n-heptane | | 7200.0 | 96.00 |
| xylene | | 300.0 | 4.00 |
| | | 7500.0 gms | 100.00% |

The cork SI Eccospheres and microballoons of the above compositions are preferably pretreated to remove any contaminants and hydrocarbons according to the following schedule:

Cork

1. Wash in water (2.5 gal per 500 gms. of cork) and drain;
2. Wash in methyl ethyl ketone (2.5 gal. per 500 gms. of cork), drain and dry;
3. Add a silane coupling agent and cure at room temperature; and
4. Screen through 100 mesh screen to break up large lumps.

SI Eccospheres and Phenolic Microballoons

1. Wash both in methyl ethyl ketone (2.5 gal. per 1000 gms. material), drain and dry;
2. Screen materials through a 100 mesh screen to break up large lumps.

After this pretreatment, the components are weighed out and assembled according to the following schedule:

1. The "A" portions of two resins are blended for 1–2 minutes;
2. The F100-A25 fibers are added and the blending continued for 3–4 minutes;
3. The product from Step (2) above is milled through a three-roll paint mill 3 or 4 times;
4. The milled product from Step (3) is then placed in a mixer and mixed for 5–6 minutes with the SI Eccospheres, cork, phenolic microballoons and carbon to yield the "A" portion of the composition; and
5. The "B" portions of the resins are blended for 1–2 minutes to yield the "B" catalyst portions of the composition.

If the composition is formulated with only the RTV-655 resin, a 24 hour cure at 300° F. is required.

EXAMPLE 2

A composition was prepared in a similar manner to that of Example 1 except that a higher curing temperature silicone resin (SYLGARD 182) and catalyst is substituted for the RTV-652 and -655 resin component, and only SI Eccospheres and F100-A25 fibers were used according to the following formulation:

| SYLGARD 182A & B | 29.7% |
|---|---|
| SI Eccospheres | 61.9% |
| F100-A25 Fibers | 8.4% |
| | 100.0% |

Xylene and n-heptane were used in the proportions shown in Example 1. The resulting composition has the advantage of being basically an all silica system and is therefore RF transparent. Density is increased to 15 lbs/ft$^3$, but a sample of this material has been cycled to 1200° to 1600° F., over 100 times with a weight loss of only 6%, the weight stabilizing after 10–20 cycles.

The following spray procedure exemplifies the preferred mode of operation in accordance with the invention.

A plate composed of an aluminum alloy is first thoroughly cleaned with a cloth moistened with methyl ethyl ketone or other suitable solvent to render the plate free of grease, oil, fingerprints, etc. A primer such as silicone primer, especially Dow Corning 1200, is then applied to the clean plate to form an even application of two cross coats. Each coat is cured for at least 1 to 4 hours depending on humidity, the lower the humidity the more time is required, at room temperature, whereby each coat produces a dry film having a thickness of 0.00005 to 0.0002 inch. The primer should extend beyond the edge of the final coating by about ¼ inch.

A base adhesive coat is applied to the primed plate. The base adhesive can preferably be a modification of the resin composition utilized. That is, for Example 1 a suitable base coat can be made from RTV-652, RTV-655, Cab-O-Sil and carbon powder with the n-heptane:xylene solvent system.

The base adhesive coating is sprayed onto the primed plate to produce an even, wet layer weighing 0.005 to 0.01 lbs/ft$^2$ with a density of about 60 lbs/ft$^3$.

As soon as possible, the primed, wet adhesive-coated plate is sprayed with the ablative compound of this invention, for instance the composition of Example 1, preferably in separate coats each about 0.03 to 0.04 inch in thickness. Each coat should preferably be applied within 2 to 5 minutes of the previous one.

The coated product is then cured. When using the composition of Example 1, the coated product can be cured according to the following schedule:

1. For about 24 hours at 70° to 100° F.; or
2. For about 8 hours at 70°–100° F. followed by about a 2 hour cure in a vented air oven at about 150° F.

The ablative composition of this invention may also be used as a peelable layer for use at locations other than the surface that had been sprayed. This may be accomplished by directly spraying the ablative composition onto a suitable surface such as metal or teflon without first priming or spraying adhesive thereon. After curing, the produced ablative layer may be peeled from the surface and utilized elsewhere, e.g., applied by secondary bonding to another surface.

The cured product has a velvety texture, is uniformly coated and free from blisters, nodules, delamination, contamination and voids greater than 1/32 inch in diameter. Preferably, the product will have a Shore "A" hardness of at least about 30.

What is claimed is:

1. A method for producing an ablative coating on a surface consisting essentially of:

preparing a sprayable coating composition by mixing components consisting essentially of the following ingredients
(a) a silicone resin;
(b) a solvent system comprising 85–100% n-heptane and 15–0% of a higher boiling inert solvent;
(c) silicaceous fibers; and
(d) hollow microspheres of silicaceous material, and subsequently and in a separate step spraying the sprayable coating composition on said surface, followed by curing the thus-formed coating to form an ablative coating having a density of about 10 to 15 lbs/ft$^3$.

2. The method of claim 1, including the step of applying a coating of a silicone primer to said surface prior to spraying said sprayable coating composition.

3. The method of claim 2, including the step of applying an adhesive to the said coating of primer prior to spraying said sprayable coating composition.

4. The method of claim 1, wherein said curing is at room temperature.

5. The method of claim 1, wherein filler material is added to the sprayable coating composition before the spraying step.

6. The method of claim 1, wherein said higher boiling solvent is xylene.

7. The method of claim 1, wherein said solvent system is a mixture of about 96% n-heptane and about 4% xylene.

8. The method of claim 5, wherein said filler material is at least one of ground cork, phenolformaldehyde microspheres, carbon powder and powdered silica.

9. The method of claim 8, wherein the sprayable coating composition consists essentially of:
(a) 2114.7 parts by weight of silicone resin;
(b) 7500.0 parts by weight of solvent comprising:
    (i) 7200 parts by weight of n-heptane; and
    (ii) 300 parts by weight of xylene
(c) 600 parts by weight of glass fibers about ¼ inch in length and about 0.0004 inch in diameter;
(d) 1385.0 parts by weight of hollow microspheres of silicaceous material; and
(e) 1438.8 parts by weight of fillers comprising:
    (i) 1155.0 parts by weight of ground cork;
    (ii) 230.0 parts by weight of phenolformaldehyde microspheres; and
    (iii) 53.8 parts by weight of powdered carbon.

10. The method of claim 1, wherein said silicone resin component (a) is a two-part resin system, one part of which comprises a curing agent for the second part.

11. The product produced by the process of claim 1.

* * * * *